United States Patent
Wada et al.

(10) Patent No.: US 12,404,128 B2
(45) Date of Patent: Sep. 2, 2025

(54) PAPER JAM INDICATION DETECTION DEVICE, PAPER JAM INDICATION DETECTION METHOD, AND RECORDING MEDIUM

(71) Applicant: Panasonic Intellectual Property Corporation of America, Torrance, CA (US)

(72) Inventors: Madoka Wada, Osaka (JP); Toshiyuki Matsumura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 6 days.

(21) Appl. No.: 17/838,456

(22) Filed: Jun. 13, 2022

(65) Prior Publication Data

US 2022/0306418 A1  Sep. 29, 2022

Related U.S. Application Data

(63) Continuation of application No. PCT/JP2021/020574, filed on May 28, 2021.

(30) Foreign Application Priority Data

Jun. 30, 2020 (JP) .................................. 2020-113445
Sep. 8, 2020 (JP) .................................. 2020-150568

(51) Int. Cl.
*B65H 7/18* (2006.01)
*H04R 1/02* (2006.01)
(Continued)

(52) U.S. Cl.
CPC .............. *B65H 7/18* (2013.01); *H04R 1/028* (2013.01); *H04R 1/08* (2013.01); *H04R 1/406* (2013.01);
(Continued)

(58) Field of Classification Search
CPC ........ B65H 7/18; B65H 3/06; B65H 2553/30; B65H 2601/10; H04R 1/028; H04R 1/08; H04R 1/406; H04R 3/005
See application file for complete search history.

(56) References Cited

U.S. PATENT DOCUMENTS

| | | | | |
|---|---|---|---|---|
| 5,443,251 | A | * | 8/1995 | Kan ...................... B65H 3/5223 271/169 |
| 2002/0079644 | A1 | * | 6/2002 | Phinney ................... B65H 7/06 399/18 |

(Continued)

FOREIGN PATENT DOCUMENTS

| JP | 2011-31999 | 2/2011 |
|---|---|---|
| JP | 2012-229066 | * 11/2012 |

(Continued)

OTHER PUBLICATIONS

International Search Report issued Jul. 13, 2021 in International (PCT) Application No. PCT/JP2021/020574.

*Primary Examiner* — Thomas A Morrison
(74) *Attorney, Agent, or Firm* — Wenderoth, Lind & Ponack, L.L.P.

(57) ABSTRACT

A paper jam indication detection device detects an indication that a paper jam will occur in a paper feed device. The paper jam indication detection device includes: a sound collector that collects a friction sound produced by friction between a plurality of sheets of paper when the paper is fed from a holder holding the plurality of sheets of the paper; an indication detector that detects an indication that a paper jam will occur in the paper feed device based on a decrease in the friction sound collected by the sound collector; and a signal outputter that, when the indication is detected by the indication detector, outputs, to the paper feed device, a signal for stopping the paper from being fed from the holder.

11 Claims, 10 Drawing Sheets

(51) Int. Cl.
  *H04R 1/08* (2006.01)
  *H04R 1/40* (2006.01)
  *H04R 3/00* (2006.01)
  *B65H 3/06* (2006.01)

(52) U.S. Cl.
  CPC ............... *H04R 3/005* (2013.01); *B65H 3/06* (2013.01); *B65H 2553/30* (2013.01); *B65H 2601/10* (2013.01)

(56) References Cited

U.S. PATENT DOCUMENTS

| | | | | |
|---|---|---|---|---|
| 2013/0093136 | A1* | 4/2013 | Sakharshete | G03G 15/703 |
| | | | | 271/265.01 |
| 2016/0304305 | A1* | 10/2016 | Link | H04N 1/00925 |
| 2020/0283252 | A1 | 9/2020 | Kiyose et al. | |
| 2021/0023372 | A1* | 1/2021 | Musallam | A61K 31/045 |

FOREIGN PATENT DOCUMENTS

| | | |
|---|---|---|
| JP | 2019-142606 | 8/2019 |
| JP | 2020-142868 | 9/2020 |

\* cited by examiner

PAPER JAM INDICATION DETECTION DEVICE, PAPER JAM INDICATION DETECTION METHOD, AND RECORDING MEDIUM

CROSS REFERENCE TO RELATED APPLICATIONS

This is a continuation application of PCT International Application No. PCT/JP2021/020574 filed on May 28, 2021, designating the United States of America, which is based on and claims priority of Japanese Patent Application No, 2020-113445 filed on Jun. 30, 2020 and Japanese Patent Application No. 2020-150568 filed on Sep. 8, 2020. The entire disclosures of the above-identified applications, including the specifications, drawings and claims are incorporated herein by reference in their entirety.

FIELD

The present disclosure relates to a paper jam indication detection device, a paper jam indication detection method, and a recording medium.

BACKGROUND

In paper feed devices that feed paper to image reading devices such as printers or image copying devices (what are known as "scanners"), paper jams may occur due to, for example, feeding multiple sheets of paper, skewed feeding, staples in the paper, and the like. Depending on the severity of the paper jam, not only will the work be delayed, but the paper itself may be damaged to the point of being unusable. What is needed, therefore, is a technique for the early detection of paper jams.

For example, Japanese Unexamined Patent Application Publication No. 2019-142606 discloses a technique for determining whether a jam in a medium such as paper (also called a "paper jam" hereinafter) is occurring based on the intensity of sounds detected by a first sound detector provided in a transport path along which the medium such as paper is transported and a second sound detector provided outside a housing within which the transport path is provided.

SUMMARY

Technical Problem

However, with the technique disclosed in Japanese Unexamined Patent Application Publication No. 2019-142606, the occurrence of a paper jam can be detected, but indications that a paper jam will occur cannot be detected.

The present disclosure provides a paper jam indication detection device, a paper jam indication detection method, and a recording medium capable of detecting an indication that a paper jam will occur.

Solution to Problem

A paper jam indication detection device according to one aspect of the present disclosure is a paper jam indication detection device that detects an indication that a paper jam will occur in a paper feed device, the paper jam indication detection device including: a sound collector that collects a friction sound produced by friction between a plurality of sheets of paper when the paper is fed from a holder holding the plurality of sheets of the paper; an indication detector that detects an indication that a paper jam will occur in the paper feed device based on a decrease in the friction sound collected by the sound collector; and a signal outputter that, when the indication is detected by the indication detector, outputs, to the paper feed device, a signal for stopping the paper from being fed from the holder.

Advantageous Effects

According to the present disclosure, a paper jam indication detection device, a paper jam indication detection method, and a recording medium capable of detecting an indication that a paper jam will occur can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Overview of the Present Disclosure

Figure 1:
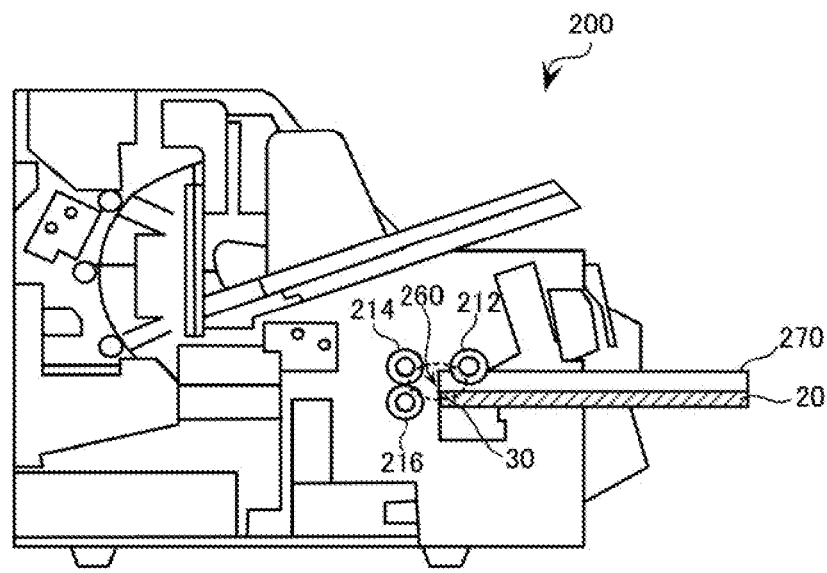
FIG. 1 is a diagram illustrating an example of a paper feed device in which a paper jam indication detection device according to Embodiment 1 is applied.

A paper jam indication detection device according to one aspect of the present disclosure is a paper jam indication detection device that detects an indication that a paper jam will occur in a paper feed device, the paper jam indication detection device including: a sound collector that collects a friction sound produced by friction between a plurality of sheets of paper when the paper is fed from a holder holding the plurality of sheets of the paper; an indication detector that detects an indication that a paper jam will occur in the paper feed device based on a decrease in the friction sound collected by the sound collector; and a signal outputter that, when the indication is detected by the indication detector, outputs, to the paper feed device, a signal for stopping the paper from being fed from the holder.

Accordingly, the paper jam indication detection device can detect lifting in the paper, which occurs before a paper jam, based on a decrease in the friction sound between sheets of the paper when the paper is fed from the holder, and can therefore detect an indication that a paper jam will occur.

In a paper jam indication detection device according to one aspect of the present disclosure, the friction sound may be a sound at a frequency in an ultrasonic band produced by friction between the paper fed from the holder and the paper held in the holder, and the decrease in the friction sound may be a decrease in a sound pressure of the friction sound.

Accordingly, the paper jam indication detection device can detect an indication that a paper jam will occur based on a decrease in a sound pressure at a frequency in an ultrasonic band in the friction sound between sheets of paper, and erroneous detections caused by the influence of audible sounds arising in the vicinity of the paper jam indication detection device, for example, can therefore be reduced.

In a paper jam indication detection device according to one aspect of the present disclosure, the sound collector may collect the friction sound using a microphone, and the indication detector may detect the indication that a paper jam will occur when the friction sound collected by the microphone decreases.

Accordingly, the paper jam indication detection device can detect an indication that a paper jam will occur based on a decrease in the friction sound collected by the microphone.

In a paper jam indication detection device according to one aspect of the present disclosure, the sound collector may collect the friction sound using a plurality of microphones, and the indication detector may detect the indication that a paper jam will occur by correlating friction sounds collected by the plurality of microphones.

Accordingly, the paper jam indication detection device can detect an indication that a paper jam will occur based on a correlation between the friction sounds collected by the plurality of microphones.

In a paper jam indication detection device according to one aspect of the present disclosure, the indication detector may detect the indication that a paper jam will occur when an absolute value of a difference between the friction sounds collected by the plurality of microphones increases.

Accordingly, the paper jam indication detection device can detect an indication that a paper jam will occur based on an increase in the absolute value of the difference between the friction sounds collected by the plurality of microphones.

In a paper jam indication detection device according to one aspect of the present disclosure, the paper feed device may include a feed port through which the paper is fed from the holder and a separation roller that separates one sheet at a time of the paper fed through the feed port, and the microphone may be disposed in a position closer to the holder than to the separation roller.

Accordingly, the microphone is provided closer to the area where the friction sound between sheets of paper arises, and thus the paper jam indication detection device can collect the friction sound more reliably. The paper jam indication detection device can therefore detect an indication that a paper jam will occur more reliably.

A paper jam indication detection device according to one aspect of the present disclosure may further include at least two protrusions that contact the paper fed from the holder, and the at least two protrusions may be disposed closer to the feed port than to a position at which the paper fed from the holder contacts the separation roller.

Accordingly, the paper jam indication detection device causes an increase in the sound pressure of the friction sound between sheets of paper produced when the paper is supplied from the holder, making it possible to more accurately detect a decrease in the sound pressure of the friction sound accompanying an indication that a paper jam will occur.

In a paper jam indication detection device according to one aspect of the present disclosure, the microphone may be disposed in a vicinity of the feed port.

Accordingly, the microphone is provided in the vicinity of the area where the friction sound between sheets of paper arises, and thus the paper jam indication detection device can collect the friction sound even more reliably. The paper jam indication detection device can therefore detect an indication that a paper jam will occur even more reliably.

In a paper jam indication detection device according to one aspect of the present disclosure, the paper feed device may further include a paper feed roller that feeds the paper from the feed port, and the microphone may be disposed above the feed port and alongside the paper feed roller with respect to a direction intersecting with a direction in which the paper is fed from the holder.

Accordingly, the microphone is disposed in the vicinity of the area where the friction sound between sheets of paper arises, without the microphone contacting the paper fed from the feed port, and thus the paper jam indication detection device can reliably collect the friction sound between the sheets of paper.

In a paper jam indication detection device according to one aspect of the present disclosure, a plurality of microphones may be disposed on respective sides of the paper feed roller with respect to a direction intersecting with the direction in which the paper is fed from the holder, the plurality of microphones each being the microphone.

Accordingly, even if the paper lifts on the left or right side of the paper feed rollers, the plurality of microphones are disposed on respective sides of the paper feed rollers with the paper feed rollers interposed therebetween, and thus the paper jam indication detection device can even more reliably collect the friction sound between sheets of paper.

Additionally, a paper jam indicating detection method according to one aspect of the present disclosure is a paper jam indication detection method for detecting an indication that a paper jam will occur in a paper feed device, the paper jam indication detection method including: collecting a friction sound produced by friction between a plurality of sheets of paper when the paper is fed from a holder holding the plurality of sheets of the paper; detecting an indication that a paper jam will occur in the paper feed device based on a decrease in the friction sound collected in the collecting; and when the indication is detected in the detecting, outputting, to the paper feed device, a signal for stopping the paper from being fed from the holder.

Accordingly, the paper jam indication detection method can detect lifting in the paper, which occurs before a paper jam, based on a decrease in the friction sound between sheets of the paper when the paper is fed from the holder, and can therefore detect an indication that a paper jam will occur.

Additionally, a recording medium according to one aspect of the present disclosure is a non-transitory computer-readable recording medium having recorded thereon a program for causing a computer to execute the paper jam indication detection method described above.

Accordingly, the same effects as those of the above-described paper jam indication detection method can be achieved using a computer.

Note that these comprehensive or specific aspects may be realized by a system, a method, a device, an integrated circuit, a computer program, or a computer-readable recording medium such as a CD-ROM, or may be implemented by any desired combination of systems, methods, devices, integrated circuits, computer programs, and recording media.

Embodiments of the present disclosure will be described in detail hereinafter with reference to the drawings. The numerical values, shapes, materials, constituent elements, arrangements and connection states of constituent elements, steps, orders of steps, and the like in the following embodiments are merely examples, and are not intended to limit the scope of the claims. Additionally, of the constituent elements in the following embodiments, constituent elements not denoted in the independent claims, which express the broadest interpretation, will be described as optional constituent elements. Additionally, the drawings are not necessarily exact illustrations. Configurations that are substantially the same are given the same reference signs in the drawings, and redundant descriptions may be omitted or simplified.

Additionally, in the present disclosure, terms indicating relationships between elements, such as "parallel" and "perpendicular", terms indicating the shapes of elements, such as "rectangular", and numerical values do not express the items in question in the strictest sense, but rather include substantially equivalent ranges, e.g., differences of several percent, as well.

Embodiment 1

Figure 2:
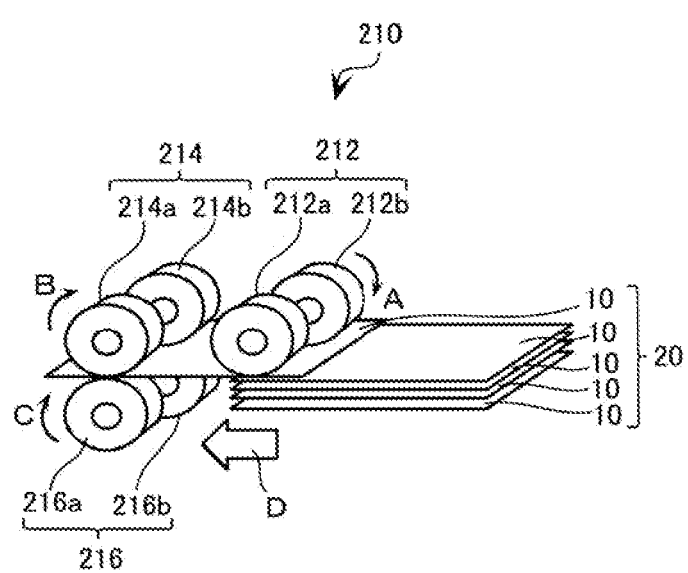
FIG. 2 is a diagram illustrating an example of a transporter of the paper feed device according to Embodiment 1.
Figure 3:
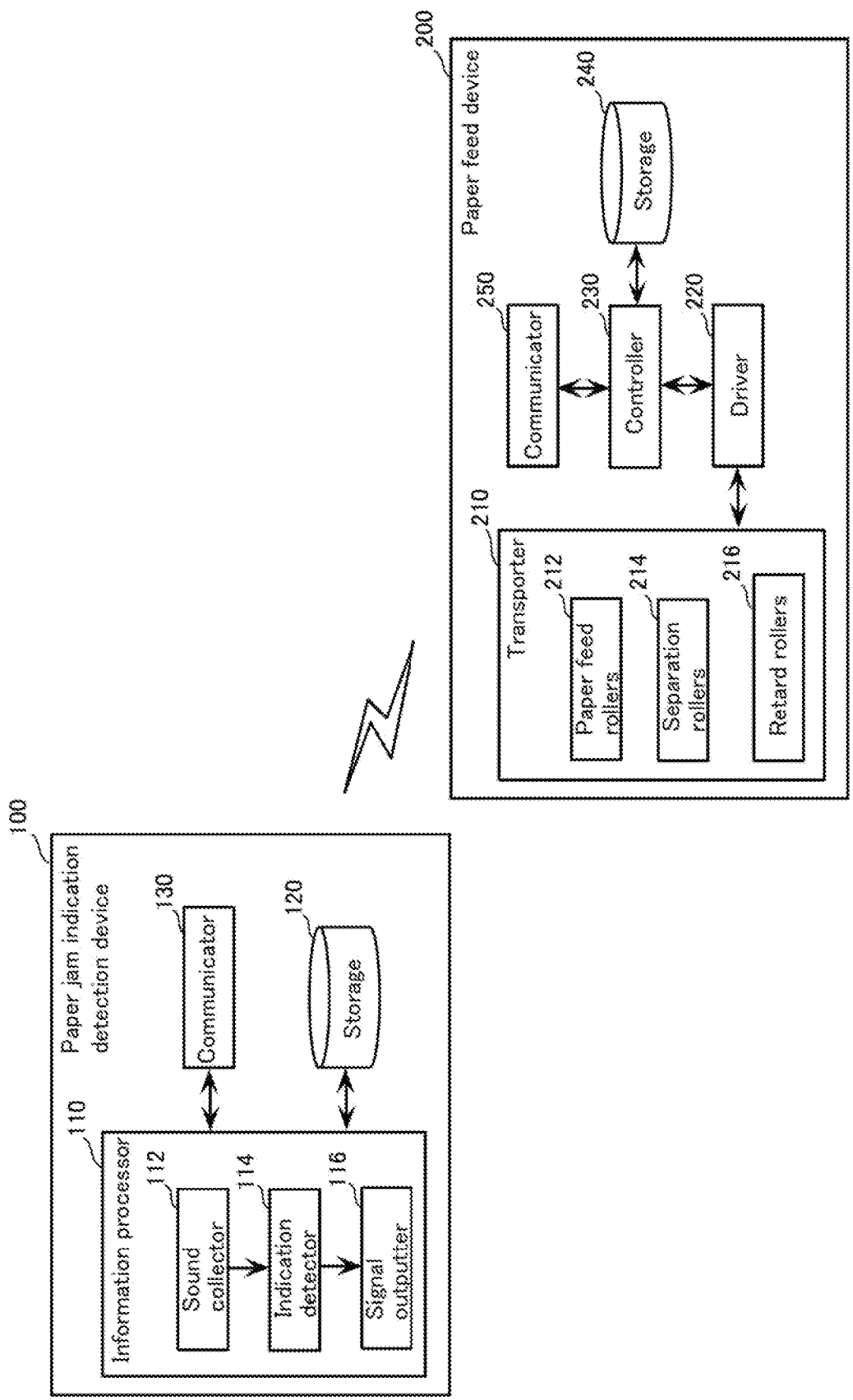
FIG. 3 is a diagram illustrating an example of the configurations of the paper jam indication detection device and the paper feed device according to Embodiment 1.

Embodiment 1 will be described in detail hereinafter with reference to the drawings.
Paper Feed Device First, a paper feed device will be described with reference to FIGS. 1, 2, and 3. FIG. 1 is a diagram illustrating an example of paper feed device 200 in which paper jam indication detection device 100 according to Embodiment 1 is applied. FIG. 2 is a diagram illustrating an example of transporter 210 of paper feed device 200 according to Embodiment 1. FIG. 3 is a diagram illustrating an example of the configurations of paper jam indication detection device 100 and paper feed device 200 according to Embodiment 1.

Paper feed device 200 supplies paper to a processing device (not shown) that processes paper, for example. The processing device may be a processor that processes supplied paper itself or performs some kind of treatment on the paper, a copying device that copies information such as text, symbols, and diagrams printed on the supplied paper to another recording medium, an output device that reads such information and outputs the information as an analog image signal, or the like.

As illustrated in FIG. 1, paper feed device 200 includes, for example, feed port 260 that feeds paper 10 from holder 270 which holds a plurality of sheets of paper 10 (see FIG. 2), paper feed rollers 212 that feed paper 10 from feed port 260, separation rollers 214 that separate one sheet at a time of paper 10 fed from feed port 260, and retard rollers 216 that rotate in a direction opposite from a rotation direction of separation rollers 214. In FIG. 1, the plurality of sheets of paper 10 illustrated in FIG. 2 are illustrated as paper bundle 20, which is indicated by hatching for the sake of clarity, Note that the broken line circle indicates an area where a part of the fed paper 10 lifts when paper 10 is fed from holder 270 and a paper jam occurs. This area will be called a "paper lift area 30" hereinafter. The lifting of paper during feeding will be described later.

Transporter 210 will be described next with reference to FIG. 2, Although feed port 260 and holder 270 are not illustrated in FIG. 2 for the sake of clarity, the plurality of sheets of paper 10 are held in holder 270 as paper bundle 20, and paper 10 is fed from feed port 260.

As illustrated in FIG. 2, paper feed rollers 212, separation rollers 214, and retard rollers 216 are each constituent elements of transporter 210. Transporter 210 separates one sheet at a time of paper 10 fed from holder 270 and transports paper 10, In the following, paper feed roller 212*a* and paper feed roller 212*b* may be referred to collectively as "paper feed rollers 212"; separation roller 214*a* and separation roller 214*b*, as "separation rollers 214"; and retard roller 216*a* and retard roller 216*b* as "retard rollers 216".

Paper feed roller 212*a* and paper feed roller 212*b* are installed so as to be capable of moving up and down freely so as to contact the uppermost paper 10 of the plurality of sheets of paper 10 in paper bundle 20 held by holder 270, and pick up the uppermost paper 10 among the plurality of sheets of paper 10 and feed that paper 10 from feed port 260. Paper feed rollers 212 are configured to be capable of easily changing position in response to changes in the thickness of paper bundle 20 within holder 270 as paper 10 is fed. Note that paper feed rollers 212 may be installed so as to contact the lowermost paper 10 of the plurality of sheets of paper 10 in paper bundle 20. In this case, feed port 260 is located below paper bundle 20.

Separation roller 214*a* and separation roller 214*b* separate one sheet at a time of paper 10 fed by paper feed rollers 212, Here, separation roller 214*a* and separation roller 214*b*, together with retard roller 216*a* and retard roller 216*b* disposed opposite separation roller 214*a* and separation roller 214*b*, function as a separator that separates one sheet at a time of paper 10, Retard rollers 216 return the fed paper 10 to holder 270 overlapping paper 10 that is in contact with separation rollers 214.

Specific operations of transporter 210 will be described next. First, by rotating in the direction of arrow A, paper feed rollers 212 pick up the uppermost paper 10 of the plurality of sheets of paper 10 held in holder 270 and feed paper 10 from feed port 260 in the direction of arrow D. Next, by rotating in the direction of arrow B, separation rollers 214 feed paper 10 in contact with separation rollers 214 in the direction of arrow D. At this time, by rotating in the direction of arrow C, retard rollers 216 return paper 10 in contact with retard rollers 216 in the direction opposite from arrow D. Retard rollers 216 have limited torque, and thus when one sheet of paper 10 is fed, paper 10 is fed in the direction of arrow D due to the movement of separation rollers 214, If, for example, two overlapping sheets of paper 10 are fed from paper feed rollers 212, paper 10 contacting separation rollers 214 is fed in the direction of arrow D, and paper 10 contacting retard rollers 216 is returned in the direction opposite from arrow D.

Through the above-described operations, transporter 210 can separate one sheet at a time of paper 10 fed from feed port 260 by paper feed rollers 212 and supply the sheet to a processing device. As a result, transporter 210 can reduce overfeeding of paper 10 supplied from holder 270, which makes it possible to reduce paper jams in paper feed device 200.

An example of the functional configuration of paper feed device 200 will be described next with reference to FIG. 3. Descriptions of constituent elements already described with reference to FIGS. 1 and 2 will be omitted or simplified.

As illustrated in FIG. 3, paper feed device 200 includes, for example, transporter 210, driver 220, controller 230 that controls the movement of driver 220, storage 240, and communicator 250.

Driver 220 drives paper feed rollers 212, separation rollers 214, and retard rollers 216 of transporter 210. For example, driver 220 includes one or more motors, and causes paper feed rollers 212, separation rollers 214, and retard rollers 216 to rotate in accordance with control signals from controller 230.

As described above, controller 230 processes information in order to control the operations of transporter 210. Controller 230 may be implemented by a microcomputer, for example, or may be implemented by a processor or dedicated circuitry.

Storage 240 is a storage device that stores control programs and the like executed by controller 230. Storage 240 is implemented by semiconductor memory, for example.

Communicator 250 is a communication module (communication line) for paper feed device 200 to communicate with paper jam indication detection device 100 and the processing device (not shown) over a local communication network. The communication performed by communicator 250 may be wireless communication or wired communication, for example. The communication standard used in the communication is not particularly limited.

Paper Jam Indication Detection Device

1. Overview, Etc

Figure 4:
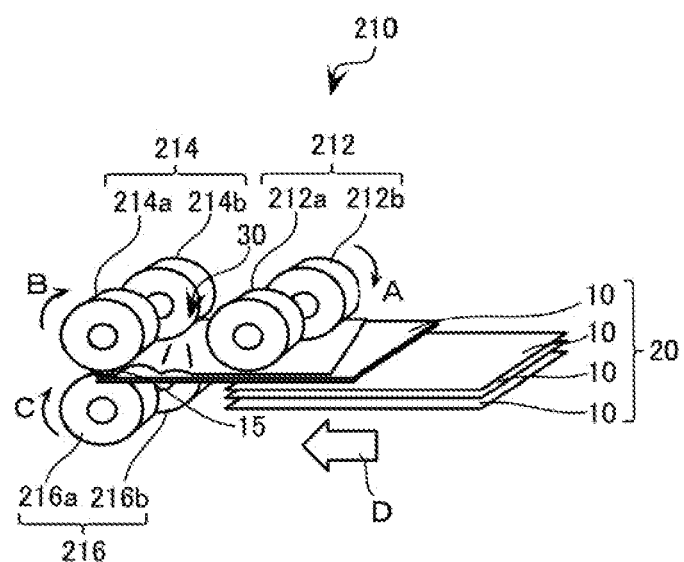
FIG. 4 is a diagram illustrating an example of an indication that a paper jam will occur, according to Embodiment 1.

An overview and the like of paper jam indication detection device 100 according to Embodiment 1 will be described next with reference to FIGS. 1 and 4. FIG. 4 is a diagram illustrating an example of an indication that a paper jam will occur, according to Embodiment 1. As in FIG. 2, holder 270 is not illustrated in FIG. 4 for the sake of clarity.

Paper jam indication detection device 100 is a device that detects an indication that a paper jam will occur in paper feed device 200. Paper jam indication detection device 100 collects a friction sound between sheets of paper 10 produced when paper 10 is fed by paper feed device 200 from holder 270 holding a plurality of sheets of paper 10, and detects an indication that a paper jam will occur in paper feed device 200 based on a decrease in the friction sound collected. Then, when an indication that a paper jam will occur is detected, paper jam indication detection device 100 outputs, to paper feed device 200, a signal for stopping the feeding of paper 10 from holder 270.

The "friction sound" is a friction sound produced by friction between the fed paper 10 and paper 10 held in holder 270 when paper 10 is fed from holder 270. Paper 10 held in holder 270 includes paper 10 that is partially held in holder 270. The friction sound is not an audible sound that can be heard by the human ear, but rather is an inaudible sound that cannot be heard by the human ear. More specifically, the friction sound is a sound at a frequency in an ultrasonic band. For example, the frequency band of the friction sound may be at least 60 kHz and at most 95 kHz; of that frequency band, at least 75 kHz and at most 95 kHz; more specifically, at least 80 kHz and at most 95 kHz; and even more specifically, at least 85 kHz and at most 90 kHz. The "decrease in the friction sound" is a decrease in the sound pressure of the friction sound, and more specifically is a decrease in the sound pressure of the frequencies in the above-described ultrasonic band.

Paper 10 fed from holder 270 may be a single sheet or a plurality of sheets. Paper 10 is separated one sheet at a time by separation rollers 214 and retard rollers 216 (described later) and fed to the processing device. Paper 10 which is held in holder 270 and produces friction with the fed paper 10 may be the uppermost paper 10 of the plurality of sheets of paper 10 held in holder 270, or may be a plurality of sheets of paper 10 including the uppermost paper 10. Paper jam indication detection device 100 collects the friction sound produced by the friction between the sheets of paper 10, and detects an indication that a paper jam will occur in paper feed device 200 based on a decrease in the friction sound.

The "indication that a paper jam will occur in paper feed device 200" is a precursor to a paper jam, and is a phenomenon that occurs immediately before a paper jam occurs due to a cause of a paper jam. For example, a situation will be described in which the cause of the paper jam is that the fed paper 10 is bound with staple 15 (referred to as being "stapled" hereinafter), as illustrated in FIG. 4. For example, when a plurality of sheets of paper 10 stapled with staple 15 are fed in the direction of arrow D by paper feed rollers 212, of the plurality of sheets of paper 10 stapled with staple 15, only paper 10 that contacts separation rollers 214 is fed in the direction of arrow D by separation rollers 214. At this time, paper 10 lifts around the area that is stapled with staple 15. This phenomenon arises at paper lift area 30 indicated in FIGS. 1 and 4. When paper 10 is fed further in the direction of arrow D by separation rollers 214, paper 10 rotates and bends around the area stapled with staple 15. If paper 10 continues to be fed in the direction of arrow D by separation rollers 214, a paper jam will occur. The occurrence of this phenomenon, in which part of paper 10 fed from holder 270 lifts, is an indication that a paper jam will occur. Paper jam indication detection device 100 detects an indication that a paper jam will occur based on a decrease in friction sound produced by friction between paper 10 fed from holder 270 and the plurality of sheets of paper 10 held in holder 270.

Although stapling is described as an example of a cause of a paper jam here, the cause of the paper jam is not limited thereto. Causes of paper jams include cases where, for example, a part of the fed paper 10 is bent, a sticky note or the like is attached to the fed paper 10, part of the fed paper 10 is bonded to another sheet of paper 10 with glue or the like, the paper quality of the fed paper 10, such as the roughness of the surface of paper 10, is different from other paper 10, and the like.

Note that the part of the fed paper 10 that lifts when paper 10 is fed from holder 270 is the vicinity of separation rollers 214, and particularly, the area between separation rollers 214 and paper feed rollers 212. For example, the part of the fed paper 10 that lifts may be, when at least two sheets of paper 10 are fed together by paper feed rollers 212, the front side of the point where separation rollers 214 contact the uppermost paper 10 of the at least two sheets of paper 10. The "front side" here refers to the direction opposite from the direction in which paper 10 is fed (the direction of arrow D in the drawing). In other words, the "front side" refers to the holder 270 side when feed port 260 is viewed from holder 270.

As described above, when separation rollers 214 separate only paper 10 that, of at least two sheets of paper 10 fed together by paper feed rollers 212, contacts separation rollers 214, and feeds the separated paper 10 toward the processing device, paper jam indication detection device 100 can detect lifting of a part of the fed paper 10 (paper lifting) based on a decrease in the friction sound between sheets of paper 10. Accordingly, paper jam indication detection device 100 can stop the feeding of paper 10 before, for example, the lifted paper 10 rotates or the like and is fed at an angle with respect to the feed direction. As such, paper jam indication detection device 100 can not only reduce the occurrence of paper jams, but can also suppress damage to paper 10 that is fed, such as bending, wrinkling, tearing, and the like.

Note that the friction sound between sheets of paper 10 is produced by friction between the fed paper 10 and paper 10 held in holder 270. Paper 10 held in holder 270 includes paper 10 that is partially held in holder 270. Accordingly, the friction sound between sheets of paper 10 is, for example, friction sound produced by friction between paper 10 contacting separation rollers 214 and other paper 10 not contacting separation rollers 214 when at least two sheets of paper 10 are fed together by paper feed rollers 212 toward separation rollers 214 and lift in the vicinity of separation rollers 214.

Furthermore, to detect the cause of a paper jam, paper jam indication detection device 100 need not emit ultrasonic waves toward the plurality of sheets of paper 10 held in holder 270 and detect reflected waves of the emitted ultrasonic waves, and instead collects the friction sound between sheets of paper 10, which is a sound at a frequency in the ultrasonic band. In other words, paper jam indication detection device 100 only needs to include a passive ultrasonic sensor rather than an active ultrasonic sensor, and can therefore detect an indication that a paper jam will occur using a simpler configuration.

2. Configuration

The configuration of paper jam indication detection device 100 will be described next with reference to FIG. 3.

Paper jam indication detection device 100 includes information processor 110, storage 120, and communicator 130, Each constituent element will be described hereinafter.

Information Processor

Information processor 110 performs information processing pertaining to the detection of an indication that a paper jam will occur, Information processor 110 is implemented by a microcomputer or a processor, for example. Specifically, information processor 110 includes sound collector 112, indication detector 114, and signal outputter 116.

Sound Collector

Sound collector 112 collects the friction sound produced by friction between sheets of paper 10 when paper 10 is fed from holder 270 holding the plurality of sheets of paper 10. More specifically, sound collector 112 collects the friction sound produced by friction between paper 10 fed from holder 270 and paper 10 held in holder 270. Sound collector 112 is a microphone, for example. In this case, sound collector 112 converts the collected friction sound into an electrical signal and outputs the electrical signal to indication detector 114.

When sound collector 112 is a microphone, sound collector 112 is disposed in a position from which the friction sound between sheets of paper 10 can be collected. For example, sound collector 112 may be disposed in a position closer to holder 270 than to separation rollers 214, i.e., on the front side when viewing separation rollers 214 from holder 270. More specifically, sound collector 112 may be disposed above holder 270. In particular, sound collector 112 may be disposed in the vicinity of feed port 260. "In the vicinity of feed port 260" means above paper feed rollers 212 from a midpoint between feed port 260 and separation rollers 214, for example. In particular, sound collector 112 may be disposed above feed port 260 and alongside paper feed rollers 212 with respect to a direction intersecting with a direction in which paper 10 is fed from holder 270. To be more specific, sound collector 112 may be disposed above feed port 260 and alongside paper feed rollers 212, with respect to a direction intersecting with a direction in which paper 10 is fed from holder 270, at the same height as paper feed rollers 212. Sound collector 112 may be disposed at any height at which there is no contact with the fed paper 10, and may be disposed alongside paper feed rollers 212 at the same height at a rotation axis of paper feed rollers 212, for example.

Note that sound collector 112 may be disposed in any position where the friction sound between sheets of paper 10 can be collected, and is not limited to being disposed above feed port 260, For example, sound collector 112 may be disposed below feed port 260, or may be disposed on a side surface of feed port 260.

Although FIG. 3 illustrates an example in which paper jam indication detection device 100 includes one sound collector 112, two or more sound collectors 112 may be included. For example, a plurality of (i.e., two or more) sound collectors 112 may be disposed on respective sides of paper feed rollers 212 with respect to the direction intersecting with the direction in which paper 10 is fed from holder 270, Indication Detector Indication detector 114 detects an indication that a paper jam will occur in paper feed device 200 based on a decrease in the friction sound collected by sound collector 112. More specifically, indication detector 114 obtains an electrical signal including the friction sound output from sound collector 112, determines whether the friction sound has decreased based on the obtained electrical signal, and detects an indication that a paper jam will occur (e.g., paper lifting) if the friction sound is determined to have decreased. As described above, the friction sound is a sound, at a frequency in an ultrasonic band, that is produced by friction between paper 10 fed from holder 270 and paper 10 held in holder 270, and the decrease in the friction sound is a decrease in the sound pressure of the friction sound. Note that the frequency of the friction sound in the ultrasonic band has been described above, and will therefore not be described again here.

For example, indication detector 114 may determine that the friction between sheets of paper 10 has decreased when the friction sound collected by sound collector 112 decreases, and detect an indication that a paper jam will occur. At this time, the decrease in the friction sound is a decrease in the sound pressure of the friction sound at a frequency in the ultrasonic band. Note that indication detector 114 may detect an indication that a paper jam will occur when the friction sound collected by sound collector 112 is lower than a predetermined value.

Additionally, for example, indication detector 114 may determine that the friction between sheets of paper 10 has decreased when an absolute value of a difference between the friction sounds collected by the plurality of sound collectors 112 increases, and detect an indication that a paper jam will occur. At this time, the increase in the absolute value of the difference between the friction sounds is an increase in the absolute value of a difference between sound pressures of the friction sounds at the frequency in the ultrasonic band. Note that indication detector 114 may detect an indication that a paper jam will occur when the absolute value of the difference between the friction sounds collected by sound collectors 112 is lower than a predetermined value.

Signal Outputter

When an indication that a paper jam will occur is detected by indication detector 114, signal outputter 116 outputs, to paper feed device 200, a signal for stopping the feeding of paper 10 from holder 270.

Storage

Storage 120 is a storage device that stores computer programs and the like executed by information processor 110. Storage 120 is implemented by semiconductor memory, a Hard Disk Drive (HDD), or the like.

Communicator

Communicator 130 is a communication channel for paper jam indication detection device 100 to communicate with paper feed device 200. Communicator 130 and paper feed device 200 may communicate directly, or via a relay device such as a wireless router or the like (not shown). Communicator 130 may be, for example, wireless communication circuitry for communicating wirelessly, or wired communication circuitry for communicating over wires. The communication standard of the communication by communicator 130 is not particularly limited.

3. Operations

Figure 5:
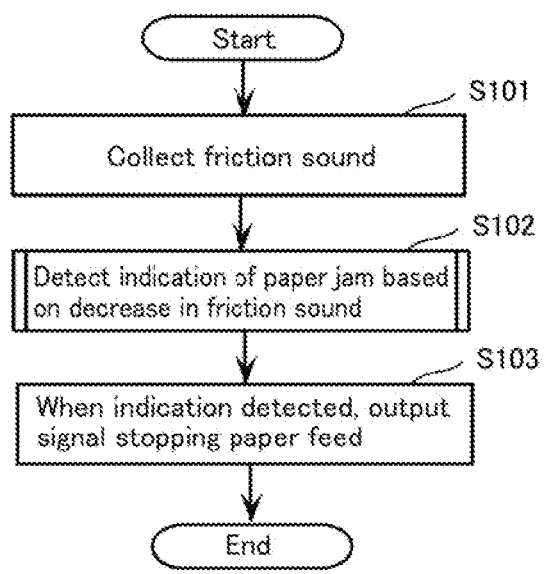
FIG. 5 is a flowchart illustrating operations of the paper jam indication detection device according to Embodiment 1.

Operations of paper jam indication detection device 100 will be described next. FIG. 5 is a flowchart illustrating operations of paper jam indication detection device 100 according to Embodiment 1.

As illustrated in FIG. 5, sound collector 112 collects the friction sound of friction between sheets of paper 10, the friction sound arising when paper 10 is fed from holder 270 (S101). Here, sound collector 112 is a microphone, for example, and converts the collected friction sound into an electrical signal and outputs the electrical signal resulting from the conversion to indication detector 114. The friction sound is a sound, at a frequency in an ultrasonic band, that is produced by friction between paper 10 fed from holder 270 and paper 10 held in holder 270, and is an inaudible sound. For example, sound collector 112 may convert sound, of the collected friction sound, at a frequency in an ultrasonic band into an electrical signal, and output the electrical signal resulting from the conversion to indication detector 114.

Next, indication detector 114 obtains the electrical signal output from sound collector 112, and based on a decrease in the friction sound between sheets of paper 10 collected by sound collector 112 in step S101, detects an indication that a paper jam will occur in paper feed device 200 (S102). For example, the decrease in the friction sound is a decrease in the sound pressure of the friction sound in the frequency in the ultrasonic band. For example, when an electrical signal converted from friction sound is output from sound collector 112, indication detector 114 may extract an electrical signal indicating a sound at a frequency in an ultrasonic band from the obtained electrical signal.

Next, when an indication that a paper jam will occur is detected by indication detector 114 in step S102, signal outputter 116 outputs, to paper feed device 200, a signal for stopping the feeding of paper 10 from holder 270 (S103).

Paper jam indication detection device 100 repeats the above-described processing flow each time paper 10 is fed from holder 270.

Step S102 will be described in detail hereinafter.

First Example

Figure 6:
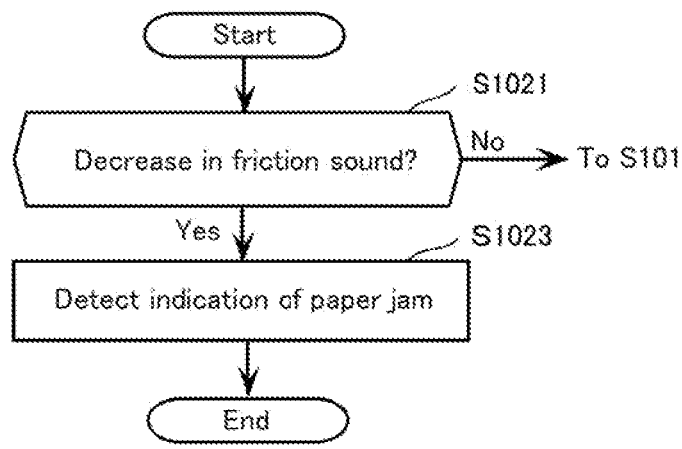
FIG. 6 is a flowchart illustrating a first example of the paper jam indication detection device according to Embodiment 1.

First, a first example will be described. FIG. 6 is a flowchart illustrating a first example of paper jam indication detection device 100 according to Embodiment 1. FIG. 6 illustrates a first example of the operations of step S102 of FIG. 5 in detail. The first example is an example of operations performed when paper jam indication detection device 100 includes one sound collector 112.

As illustrated in FIG. 6, upon obtaining the electrical signal output from sound collector 112, indication detector 114 determines whether the friction sound between sheets of paper 10 has decreased (S1021). For example, indication detector 114 may determine whether the friction sound between sheets of paper 10 collected by sound collector 112 in step S101 of FIG. 5 is lower than a predetermined value. More specifically, when the sound pressure of the frequency of the friction sound in an ultrasonic band decreases, indication detector 114 may determine whether the sound pressure is lower than a predetermined value. The predetermined value may be a value set when shipping the device from the factory, a value updated based on past history such as, for example, the history of the previous instance of driving, or a value set by the user.

The processing returns to step S101 if indication detector 114 determines that the friction sound between the sheets of paper 10 has not decreased (No in S1021), On the other hand, indication detector 114 detects an indication that a paper jam will occur in paper feed device 200 (S1023) if the friction sound between the sheets of paper 10 is determined to have decreased (Yes in S1021).

Second Example

Figure 7:
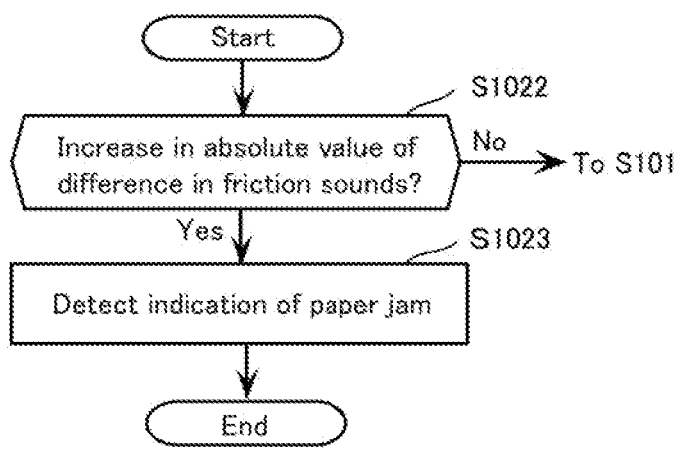
FIG. 7 is a flowchart illustrating a second example of the paper jam indication detection device according to Embodiment 1.

Next, a second example will be described. FIG. 7 is a flowchart illustrating a second example of the operations of step S102 of FIG. 5 in detail. The second example is an example of operations performed when paper jam indication detection device 100 includes a plurality of sound collectors 112. Descriptions of details already described in the first example will be simplified or omitted in the second example.

As illustrated in FIG. 7, upon obtaining electrical signals output by the plurality of sound collectors 112, indication detector 114 determines whether the absolute value of a difference between the friction sounds of the sheets of paper 10, collected by sound collectors 112 in step S101 of FIG. 5, has increased (S1022). More specifically, indication detector 114 determines whether a difference between sound pressures at a frequency in an ultrasonic band, in the friction sounds collected by sound collectors 112, has increased.

For example, if paper jam indication detection device 100 includes two sound collectors 112, indication detector 114 obtains electrical signals including the friction sounds collected by the two sound collectors 112, and derives the absolute value of a difference between the obtained electrical signals including the friction sounds. Then, if the derived absolute value of the difference is greater than a predetermined value, for example, indication detector 114 may determine that the absolute value of the difference between the friction sounds has increased.

Additionally, if, for example, paper jam indication detection device 100 includes three or more sound collectors 112, indication detector 114 obtains electrical signals including the friction sounds collected by the three or more sound collectors 112, derives a combination of any two sound collectors 112 among the three or more sound collectors 112, and derives the absolute value of a difference between the friction sounds in the derived combination of sound collectors 112. For example, when there are three sound collectors 112, there are three possible combinations of two sound collectors 112. Then, if at least one of the derived absolute values is greater than a predetermined value, for example, indication detector 114 may determine that the absolute value of the difference between the friction sounds has increased.

The processing returns to step S101 if indication detector 114 determines that the absolute value of the difference between the friction sounds collected by the plurality of sound collectors 112 has not increased (No in S1022).

On the other hand, indication detector 114 determines that the friction between the sheets of paper 10 has decreased, and detects an indication that a paper jam will occur in paper feed device 200 (S1023), if the absolute value of the difference between the friction sound of the sheets of paper 10 is determined to have increased (Yes in S1022).

4. Effects, Etc

As described above, paper jam indication detection device 100 is a paper jam indication detection device that detects an indication that a paper jam will occur in paper feed device 200, and includes: sound collector 112 that collects a friction sound produced by friction between a plurality of sheets of paper 10 when paper 10 is fed from holder 270 holding the plurality of sheets of paper 10; indication detector 114 that detects an indication that a paper jam will occur in paper feed device 200 based on a decrease in the friction sound collected by sound collector 112; and signal outputter 116 that, when the indication is detected by indication detector 114, outputs, to paper feed device 200, a signal for stopping paper 10 from being fed from holder 270.

This paper jam indication detection device 100 can detect lifting in paper 10, which occurs before a paper jam, from a decrease in the friction sound between sheets of paper 10 when paper 10 is fed from holder 270, and can therefore detect an indication that a paper jam will occur.

Additionally, paper jam indication detection device 100 can detect a decrease in sound pressure at a frequency in an ultrasonic band in the friction sound between sheets of paper 10, and is therefore less susceptible to the influence of audible sounds from around the paper jam indication detection device than when detecting audible sounds produced when a paper jam occurs, as in past techniques. Paper jam indication detection device 100 can therefore reliably detect a decrease in sound pressure in an ultrasonic band.

Additionally, although the past techniques detect sound produced when a paper jam occurs and therefore cannot prevent paper jams from occurring, in the present embodiment, paper jam indication detection device 100 detects lifting of the fed paper 10 by a decrease in the friction sound, and can therefore both prevent the occurrence of paper jams and suppress damage to paper 10.

Furthermore, in the present embodiment, it is not necessary to emit ultrasonic waves toward the plurality of sheets of paper 10 held in holder 270 in order to confirm the state of the fed paper 10, such as stapling or the like. In other words, in the present embodiment, paper jam indication detection device 100 need not include an ultrasonic wave emitter, and only needs to include sound collector 112 that collects sound at a frequency in an ultrasonic band in the friction sound. As such, paper jam indication detection device 100 can detect an indication that a paper jam will occur more easily and with a simpler configuration than a configuration including an ultrasonic wave emitter.

Embodiment 2

Paper Jam Indication Detection Device

Figure 8:
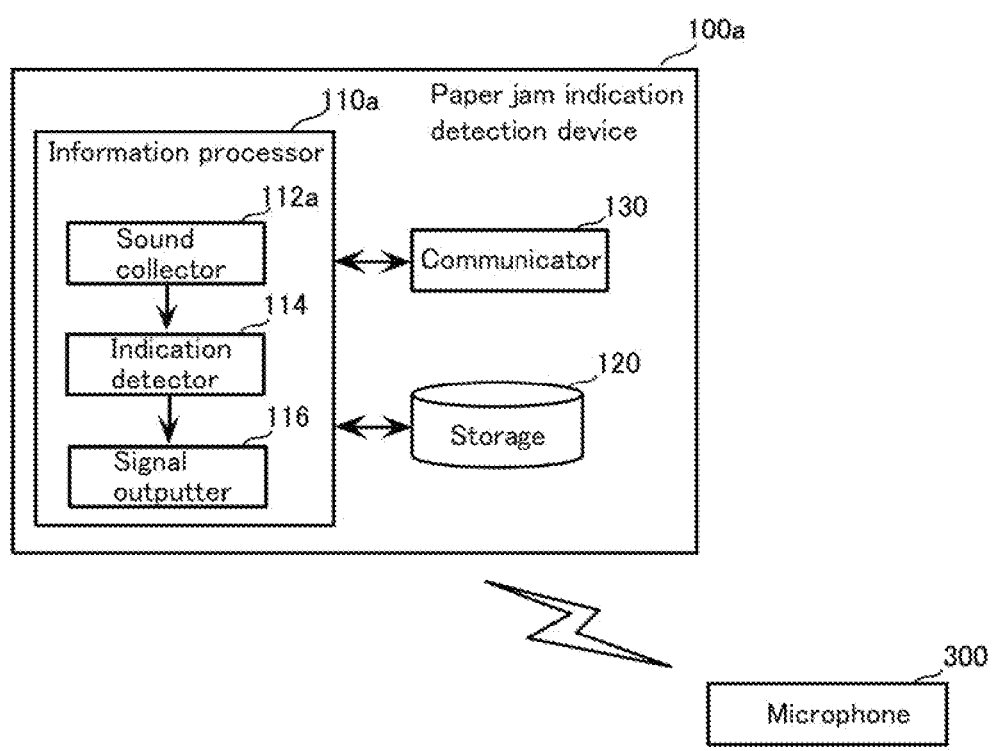
FIG. 8 is a diagram illustrating an example of the configuration of a paper jam indication detection device according to Embodiment 2.

Paper jam indication detection device 100a according to Embodiment 2 will be described next with reference to FIG. 8. FIG. 8 is a diagram illustrating an example of the configuration of paper jam indication detection device 100a according to Embodiment 2. The following will focus on points different from Embodiment 1, and descriptions of identical details will be simplified or omitted.

1. Configuration

Embodiment 1 described an example in which sound collector 112 is a microphone, but Embodiment 2 differs from Embodiment 1 in that sound collector 112a obtains an electrical signal, including friction sound, output from microphone 300. Information processor 110a includes sound collector 112a, indication detector 114, and signal outputter 116.

Sound collector 112a obtains, as an electrical signal, a friction sound collected by at least one microphone 300, for example, and outputs the obtained electrical signal to indication detector 114. Microphone 300 and sound collector 112a may be connected by wired or wireless communication.

2. Operations

In Embodiment 2, sound collector 112a obtains the electrical signal including friction sound collected by microphone 300, and thus the processing of step S101 in FIG. 5, referenced in Embodiment 1, is different.

For example, in Embodiment 2, an electrical signal including friction sound collected by microphone 300 is obtained in step S101 of FIG. 5, Sound collector 112a may then output the obtained electrical signal to indication detector 114.

Additionally, for example, in Embodiment 2, an electrical signal including friction sound collected by a plurality of microphones 300 is obtained in step S101 of FIG. 5. Sound collector 112a may then output the obtained electrical signal to indication detector 114.

As described thus far, Embodiment 2 differs from Embodiment 1 in that paper jam indication detection device 100a obtains an electrical signal including friction sound collected by microphone 300 and performs information processing related to indication detection.

3. Effects, Etc

Paper jam indication detection device 100a according to Embodiment 2 is configured as an entity separate from microphone 300, and thus the position and number of microphone 300 can be changed as appropriate according to the design, making it possible to implement paper jam indication detection device 100a in a single integrated circuit.

Variation 1

Paper Jam Indication Detection Device

Figure 9:
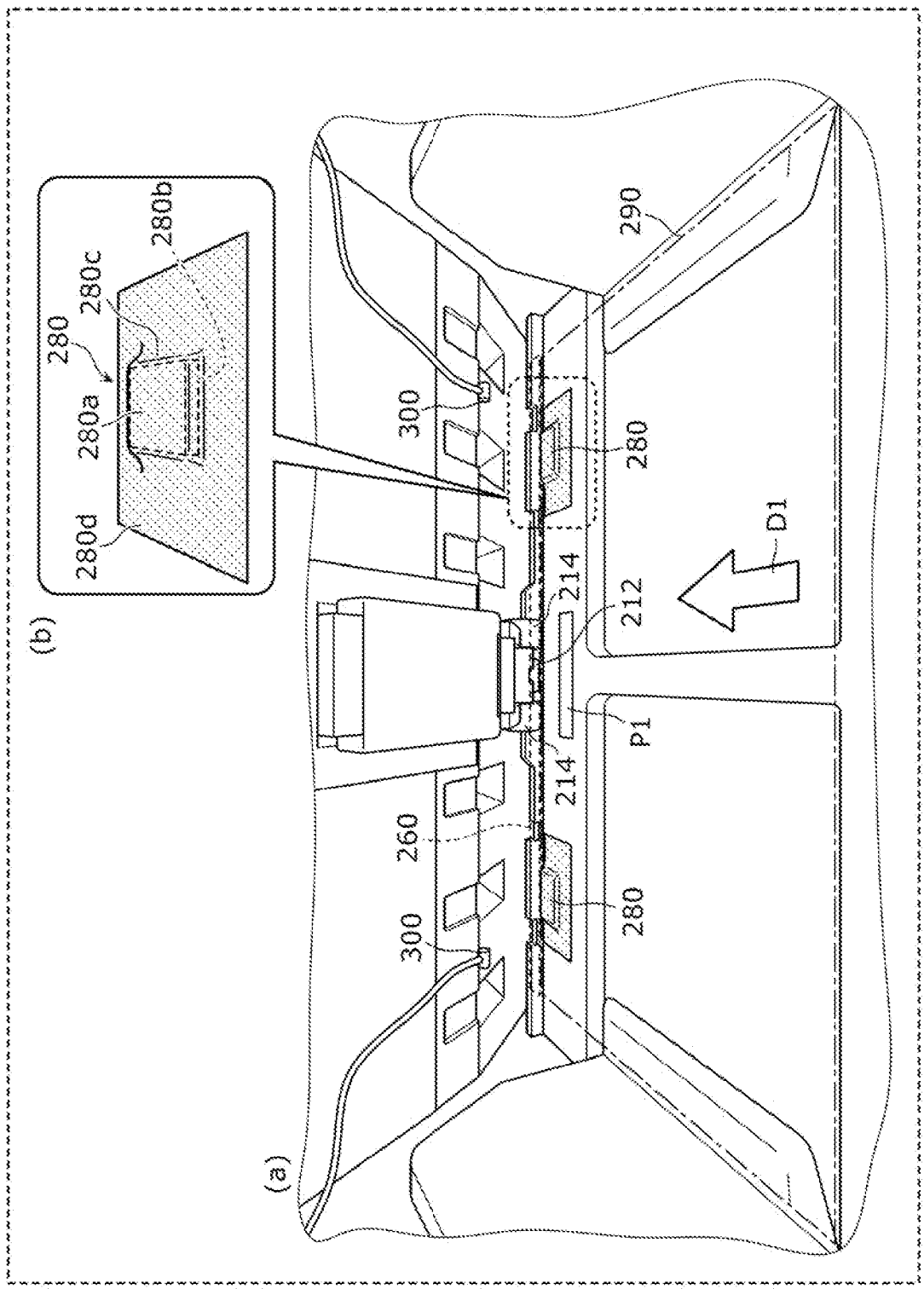
FIG. 9 is a diagram illustrating an example of a plurality of protrusions provided in a paper jam indication detection device according to Variation 1.

A paper jam indication detection device according to Variation 1 will be described next with reference to FIGS. 1, 2, and 9. FIG. 9 is a diagram illustrating an example of a plurality of protrusions 280 provided in the paper jam indication detection device according to Variation 1. The paper jam indication detection device includes two protrusions 280 in the example illustrated in FIG. 9, but may include one protrusion 280, or three or more. The paper jam indication detection device according to Variation 1 differs from Embodiments 1 and 2 in that two or more protrusions 280 that contact paper 10 fed from holder 270 are provided in addition to the configuration of Embodiment 1 or Embodiment 2. The following will focus on points different from Embodiments 1 and 2, and descriptions of identical details will be simplified or omitted.

1. Configuration

The paper jam indication detection device according to Variation 1 further includes two or more protrusions 280 that contact the paper fed from holder 270. For example, the two or more protrusions 280 are disposed closer to feed port 260 than to a position where paper feed rollers 212 contact paper 10 fed from holder 270 (called "contact position P1" hereinafter). For example, the two or more protrusions 280 may be disposed closer to feed port 260 than to the position where paper feed rollers 212 contact paper 10 fed from holder 270 ("contact position P1"), and may be disposed in a direction intersecting with a direction in which paper 10 is fed from holder 270 (called "feed direction D1" hereinafter).

For example, as illustrated in FIG. 9, the two protrusions 280 may be disposed on respective sides of contact position P1 in a direction intersecting with feed direction D1, e.g., a lengthwise direction of feed port 260. In this case, the two protrusions 280 may be disposed on respective sides of contact position P1 in the lengthwise direction of feed port 260, at equal distances from contact position P1.

Additionally, for example, the two protrusions 280 may be disposed on respective sides of contact position P1 in directions that intersect with feed direction D1 and are different directions from each other. In this case, the two protrusions 280 may be disposed on respective sides of contact position P1 in a direction intersecting with feed direction D1, and furthermore, protrusions 280 may be different distances from contact position P1, and protrusions 280 may be disposed in a direction intersecting with the lengthwise direction of feed port 260 or in the lengthwise direction of feed port 260.

Additionally, four protrusions 280 may be disposed as two sets of protrusions 280, for example, with respective sets of protrusions 280 disposed on respective sides of contact position P1 in a direction intersecting with feed direction D1. In this case, the four protrusions 280 may be disposed such that the sets of protrusions 280 are equal distances from contact position P1, and furthermore, the sets of protrusions 280 may be disposed in the lengthwise direction of feed port 260 or in a direction intersecting with the lengthwise direction of feed port 260.

Additionally, for example, in the four protrusions, the two sets of protrusions 280 may be disposed on respective sides of contact position P1 in directions that intersect with feed direction D1 and are different directions from each other. In this case, the four protrusions 280 may be disposed such that one set of protrusions 280 is disposed on respective sides of contact position P1 in a direction intersecting with the feed direction, and furthermore, protrusions 280 in the one set may be at different distances or the same distance from contact position P1. The other set of protrusions 280 among the four protrusions 280 may be disposed in the same direction as, or a different direction from, the direction in which the stated one set of protrusions 280 is disposed.

Additionally, three protrusions 280 may be disposed on respective sides of contact position P1 in a direction in which two protrusions 280 are disposed in a direction intersecting with feed direction D1 with respect to the other one of the three protrusions 280, with the one protrusion 280 being disposed in a direction different from the other two protrusions 280.

For example, two or more protrusions 280 may be disposed on feed surface 290 that forms a feed path for paper feed rollers 212 to feed paper 10 from holder 270 to separation rollers 214.

The shape and size of protrusion 280 can be designed as desired, and are not particularly limited. For example, the shape of protrusions 280 may be a tapered shape or a pillar shape. The tapered shape is, for example, a hemispherical shape, a semi-ellipsoidal shape, a conical shape, a polygonal trapezoidal shape, or the like. The pillar shape is, for example, a cylindrical shape, an elliptical shape, a polygonal pillar shape, or the like. In the example in FIG. 9, each of the two protrusions 280 has a square top face 280a and bottom face 280b, as well as side face 280c having a height of 5 mm. Top face 280a and bottom face 280b may be the same size, or top face 280a may be smaller than bottom face 280b.

An example has been described in which two or more protrusions 280 are disposed closer to feed port 260 than to contact position P1 where paper feed rollers 212 contact paper 10 fed from holder 270, the configuration is not limited to this example. For example, two or more protrusions 280 may be disposed closer to feed port 260 than to a position where separation rollers 214 contact paper 10 fed from holder 270.

2. Operations

The paper jam indication detection device according to Variation 1 executes the operations described in Embodiment 1 or Embodiment 2, depending on the form of the sound collector. These operations have already been described in detail in Embodiments 1 and 2, and will therefore not be described here.

3. Effects, Etc

The paper jam indication detection device according to Variation 1 includes two or more protrusions 280, which causes an increase in the sound pressure of the friction sound between sheets of paper produced when paper 10 is supplied from holder 270, making it possible to more accurately detect a decrease in the sound pressure of the friction sound accompanying an indication that a paper jam will occur, such as paper lifting or the like, for example.

WORKING EXAMPLES

The paper jam indication detection device and the paper jam indication detection method according to the present disclosure will be described in detail hereinafter according to working examples, but the following working examples are merely examples, and the present disclosure is not intended to be limited to the following working examples in any way.

The following will describe (1) results of verifying frequencies at which a decrease in the sound pressure of the friction sound is seen; (2) results of verifying the accuracy of indication detection depending on differences in microphone placement; (3) results of verifying the sound pressure of the friction sound when protrusions are disposed in the vicinity of the feed port; (4) results of verifying the accuracy of indication detection depending on whether protrusions are provided; and (5) results of verifying correlation between the sound pressures of friction sounds collected by two microphones.

One microphone was used in the following (1) to (4),
(1) Results of Verifying Frequencies at which Decrease in Sound Pressure of Friction Sound is Seen The frequency bands at which a decrease in the friction sound between sheets of fed paper is seen were verified through Comparative Example 1 and Working Example 1, The microphone was placed above the feed port and to the side of the paper feed rollers. The frequency band of the friction sound collected was at least 60 kHz and at most 100 kHz.

Comparative Example 1

Figure 10:
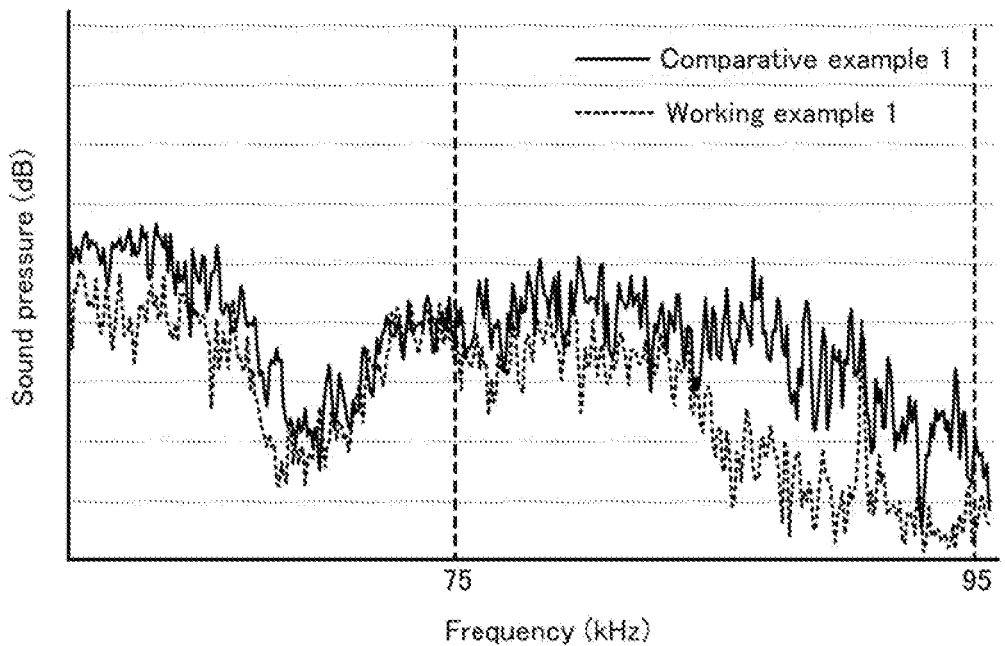
FIG. 10 is a diagram illustrating results of Comparative Example 1 and Working Example 1.

In Comparative Example 1, the friction sound arising between sheets of paper when the paper was fed from the holder was collected, using standard paper. FIG. 10 illustrates the results thereof. FIG. 10 is a diagram illustrating the results of Comparative Example 1 and Working Example 1. The friction sound collected in Comparative Example 1 is indicated by the solid line.

Working Example 1

In Working Example 1, the friction sound arising between sheets of paper when the paper was fed from the holder was collected, using paper which was stapled together. FIG. 10 illustrates the results thereof. The friction sound collected in Working Example 1 is indicated by the broken line.

Results

As indicated in FIG. 10, comparing the sound pressure of the friction sound arising when standard paper is fed, indicated in Comparative Example 1, with the sound pressure of the friction sound arising when paper which is stapled together is fed, indicated in Working Example 1, the sound pressure in Working Example 1 was lower than the sound pressure in Comparative Example 1 in a frequency band of at least 60 kHz and at most 95 kHz, Among these, the sound pressure in Working Example 1 was lower than the sound pressure in Comparative Example 1 in a frequency band of at least 75 kHz and at most 95 kHz, and in particular, the sound pressure in Working Example 1 was further lower than the sound pressure in Comparative Example 1 in a frequency band of at least 85 kHz and at most 90 kHz.

Accordingly, it was found that a decrease in the friction sound when feeding paper from the holder can be used to reliably detect an indication that a paper jam will occur by detecting a decrease in the sound pressure in the frequency band of at least 85 kHz and at most 90 kHz in the friction sound, among the sound pressures in the above-described frequency bands.
(2) Results of Verifying Accuracy of Indication Detection Depending on Differences in Microphone Placement Differences in the detection accuracy depending on the microphone placement were verified through Comparative Example 2 and Working Example 2, with respect to the decrease in the sound pressure in the frequency band of at least 85 kHz and at most 90 kHz among the frequency bands verified in the above-described (1).

Comparative Example 2

Figure 11:
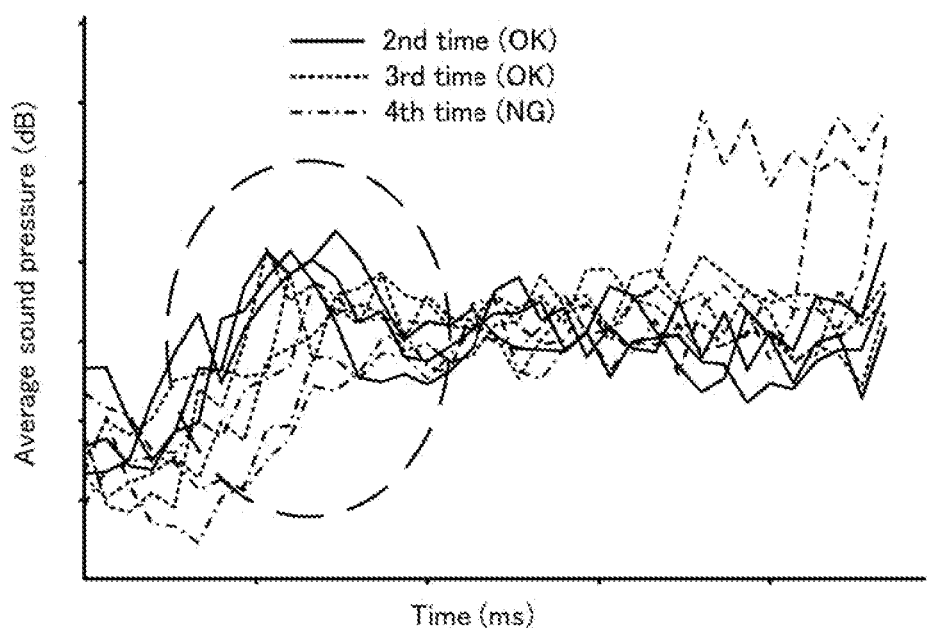
FIG. 11 is a diagram illustrating results of Comparative Example 2.

In Comparative Example 2, the microphone was disposed next to the separation rollers, and the friction sound between sheets of paper when paper was fed from the holder was collected. The first to third sheets of paper fed from the holder were standard sheets of paper, whereas the fourth sheet was two sheets of paper stapled together. The first to fourth sheets were fed consecutively, and the friction sound arising during the feeding was collected using the microphone. These operations were repeated three times. FIG. 11 illustrates the results thereof. FIG. 11 is a diagram illustrating the results of Comparative Example 2.

In FIG. 11, the vertical axis represents the time-averaged sound pressure, and the horizontal axis represents the time sound was collected by the microphone. The solid line indicates the sound pressure of the friction sound when the second sheet of paper was fed, the broken line indicates the sound pressure of the friction sound when the third sheet of paper was fed, and the dot-dashed line indicates the sound pressure of the friction sound when the stapled fourth sheet of paper was fed.

As indicated in FIG. 11, the stapled fourth sheet of paper produced a paper jam, and thus the sound pressure is higher than the other two sheets of paper in the latter half of the graph. In FIG. 11, there was no meaningful decrease in the friction sounds of the second to fourth sheets of paper.

Accordingly, Comparative Example 2 confirmed that when the microphone is disposed next to the separation rollers, it is difficult to detect a decrease in the friction sound before a paper jam occurs.

Working Example 2

Figure 12:
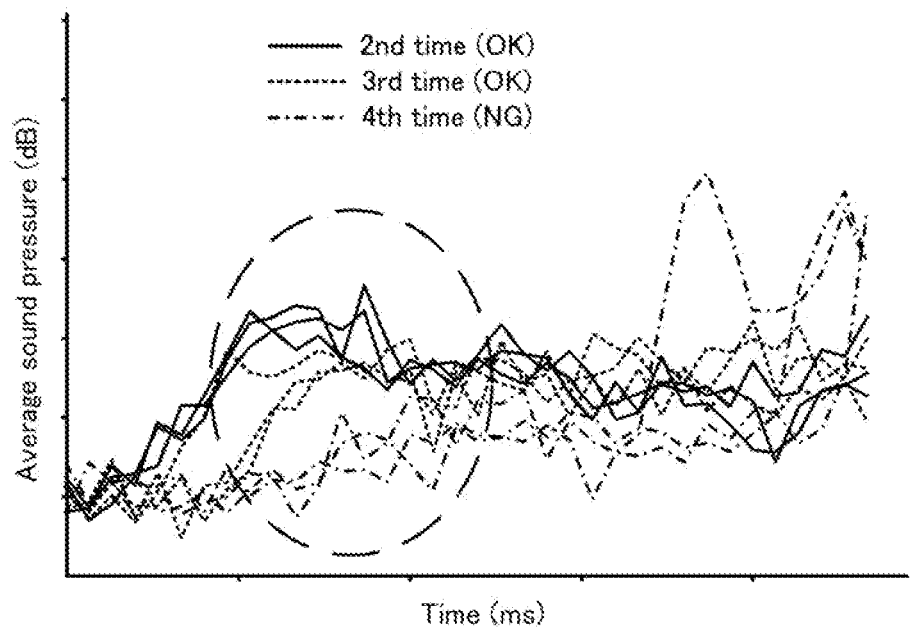
FIG. 12 is a diagram illustrating results of Working Example 2.

Working Example 2 was the same as Comparative Example 2, except that the microphone was placed above the feed port and to the side of the paper feed rollers. FIG. 12 illustrates the results thereof. FIG. 12 is a diagram illustrating the results of Working Example 2.

As indicated in FIG. 12, a meaningful decrease in the time-averaged sound pressure was seen for the stapled fourth sheet of paper as compared to the other two sheets of paper (the second and third sheets).

Accordingly, Working Example 2 confirmed that when the microphone is disposed above the feed port and to the side of the paper feed rollers, a decrease in the sound pressure of the friction sound can be detected before a paper jam occurs, which means that an indication that a paper jam will occur can be detected.

Conclusion

The results of Comparative Example 1 and Working Example 1 show that, of the sound pressures at frequencies in an ultrasonic band in the friction sounds, there was almost twice the difference in sound pressure, particularly in the frequency band of at least 85 kHz and at most 90 kHz. It is therefore possible to set a threshold for the sound pressure of the friction sound in order to detect the indication.

The results of Comparative Example 2 and Working Example 2 also showed that placing the microphone closer to the area where the friction sound arises enables the friction sound to be collected more reliably, and improves the accuracy with which the decrease in friction sound is detected. For example, it is preferable that the microphone be disposed closer to the holder than to the separation rollers. More specifically, it is preferable that the microphone be disposed above the holder. Of these positions, it was found to be preferable to dispose the microphone in the vicinity of the feed port (e.g., a position from a midpoint between the separation rollers and the feed port to above the paper feed rollers), and particularly in a position that is above the feed port and alongside the paper feed rollers with respect to a direction intersecting with the direction in which the paper is fed from the holder.

Additionally, based on the results of Comparative Example 2 and Working Example 2, the paper jam indication detection device according to the present disclosure can detect a decrease in sound pressure at a frequency in an ultrasonic band in the friction sound, and is therefore less susceptible to the influence of audible sounds from around the paper jam indication detection device than when detecting audible sounds produced when a paper jam occurs, as in past techniques. The paper jam indication detection device according to the present disclosure can therefore reliably detect a decrease in sound pressure in an ultrasonic band.

Additionally, although the past techniques detect sound produced when a paper jam occurs and therefore cannot prevent paper jams from occurring, in the present disclosure, the paper jam indication detection device detects lifting of the fed paper by a decrease in the friction sound, and can therefore both prevent the occurrence of paper jams and suppress damage to the paper.

Furthermore, in the present disclosure, it is not necessary to emit ultrasonic waves toward the plurality of sheets of paper held in the holder in order to confirm the state of the fed paper, such as stapling or the like. In other words, in the present disclosure, the paper jam indication detection device need not include an ultrasonic wave emitter, and only needs to include a sound collector that collects sound at a frequency in an ultrasonic band in the friction sound. As such, the paper jam indication detection device according to the present disclosure can detect an indication that a paper jam will occur more easily and with a simpler configuration than a configuration including an ultrasonic wave emitter.

(3) Results of Verifying Sound Pressure of Friction Sound when Protrusions are Disposed in the Vicinity of Feed Port Comparative Example 3 and Working Example 3 verified whether the sound pressure of the friction sound between sheets of paper increased when paper is fed from the holder to the separation rollers, in a configuration where two protrusions are provided in the vicinity of the feed port. As in the example in FIG. 9, the two protrusions were disposed closer to the feed port than to the position where the paper feed rollers contact the paper fed from the holder. Each of the two protrusions had a rectangular top face and bottom face (15 mm by 25 mm), as well as a side face having a height of 5 mm. Additionally, one microphone was disposed in a position above the feed port and in a direction intersecting with the direction in which the paper is fed from the holder. The frequency band of the friction sound collected by the microphone was at least 20 kHz and at most 100 kHz.

Comparative Example 3

Figure 13:
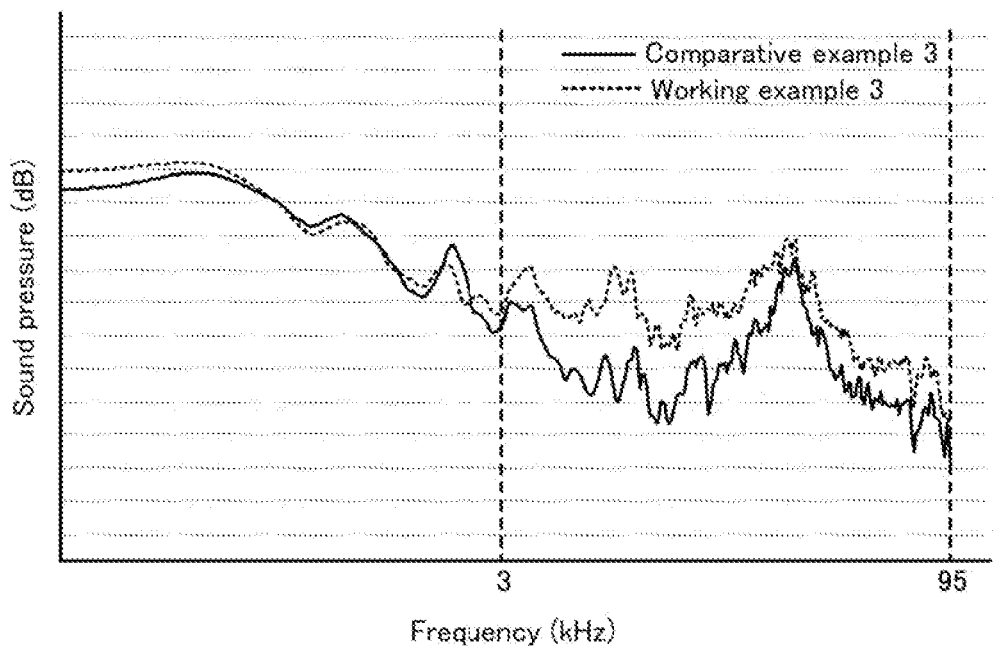
FIG. 13 is a diagram illustrating results of Comparative Example 3 and Working Example 3.

In Comparative Example 3, the two protrusions were not provided in the vicinity of the feed port, and the friction sound arising between sheets of paper when the paper was fed from the holder was collected, using standard paper. FIG. 13 illustrates the results thereof. FIG. 13 is a diagram illustrating the results of Comparative Example 3 and Working Example 3. The friction sound collected in Comparative Example 3 is indicated by the solid line. In FIG. 13, the vertical axis represents the sound pressure at each frequency of the friction sound collected by the microphone.

Working Example 3

Working Example 3 was carried out in the same manner as Comparative Example 3, except for the two protrusions being disposed in the vicinity of the feed port. FIG. 13 illustrates the results thereof. The friction sound collected in Working Example 3 is indicated by the broken line.

Results

As indicated in FIG. 13, the sound pressure of the friction sound collected in Working Example 3 was greater than the sound pressure of the friction sound collected in Comparative Example 3 in an ultrasonic band (i.e., a frequency band of at least 2 kHz), and particularly in a frequency band of at least 3 kHz and at most 95 kHz. This result shows that disposing the two protrusions in the vicinity of the feed port, and more specifically, closer to the feed port than the position where the paper feed rollers contact the paper fed from the holder (called a "contact position"), increases the sound pressure of the friction sound between sheets of paper as compared to a configuration where the protrusions are not provided.

This is thought to result in a more pronounced decrease in the sound pressure of the friction sound when paper lifting occurs, because the sound pressure of the friction sound increases when the two protrusions are disposed in the vicinity of the feed port as compared to a configuration where no protrusions are provided.

Therefore, it is thought that the decrease in friction sound accompanying an indication of a paper jam, such as the paper lifting, can be detected more accurately.

(4) Results of Verifying Accuracy of Detection of Indication that Paper Jam Will Occur Depending on Whether Protrusions are Provided Comparative Example 4 and Working Example 4 verified differences in the accuracy of detection depending on whether protrusions are provided, for the decrease in sound pressure in a frequency band of at least 85 kHz and at most 90 kHz. The microphone was disposed in the same position as in the above-described (3).

Comparative Example 4

In Comparative Example 4, no protrusions were provided, and the friction sound arising between sheets of paper when the paper was fed from the holder was collected. As in Comparative Example 2, the first to third sheets of paper fed from the holder were standard sheets of paper, whereas the fourth sheet was two sheets of paper stapled together. The first to fourth sheets were fed consecutively, and the friction sound arising during the feeding was collected using the microphone. These operations were repeated five times.

Figure 14:
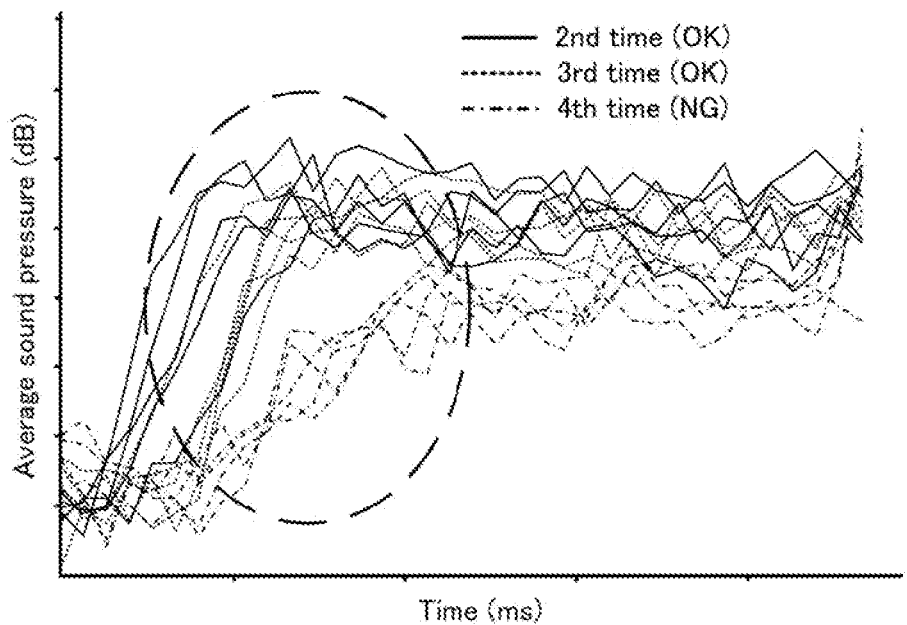
FIG. 14 is a diagram illustrating results of Comparative Example 4.

FIG. 14 illustrates the results thereof. FIG. 14 is a diagram illustrating the results of Comparative Example 4, In FIG. 14, the vertical axis represents the time-averaged sound pressure (called simple "average sound pressure"), and the horizontal axis represents the time sound was collected by the microphone. The solid line indicates the sound pressure of the friction sound when the second sheet of paper was fed, the broken line indicates the sound pressure of the friction sound when the third sheet of paper was fed, and the dot-dashed line indicates the sound pressure of the friction sound when the stapled fourth sheet of paper was fed.

As indicated in FIG. 14, the stapled fourth sheet of paper produced a paper jam, and thus the sound pressure is higher than the other two sheets of paper (the second and third sheets) in the latter half of the graph. Additionally, in FIG. 14, the stapled fourth sheet of paper showed a decrease in the sound pressure of the friction sound, which is an indication that a paper jam will occur, at the time indicated by the broken line circle.

Working Example 4

Figure 15:
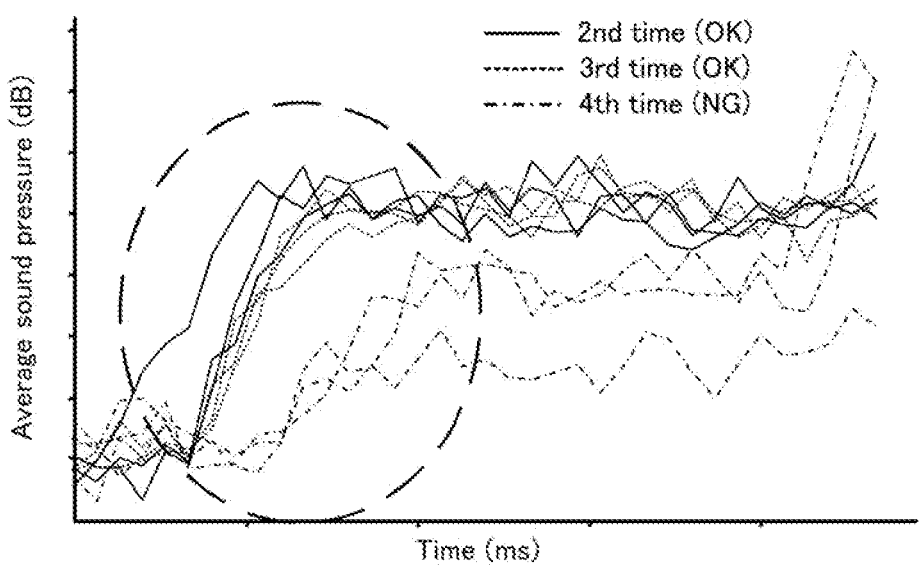
FIG. 15 is a diagram illustrating results of Working Example 4.

Working Example 4 was carried out in the same manner as Comparative Example 4, except for the two protrusions being disposed in the vicinity of the feed port and the operations being repeated three times. The positions of the two protrusions were the same as in Working Example 3. FIG. 15 illustrates the results thereof. FIG. 15 is a diagram illustrating the results of Working Example 4.

As indicated in FIG. 15, both the sound pressure of the friction sound when the second and third sheets of standard paper were fed and the sound pressure of the friction sound when the stapled fourth sheet of paper was fed increased, but the sound pressure for the second and third sheets of standard paper increased more than the sound pressure for the stapled fourth sheet of paper.

Additionally, comparing the average sound pressures for the times in the broken line circles in FIGS. 14 and 15, the stapled fourth sheet of paper showed a more pronounced decrease in the sound pressure of the friction sound in Working Example 4 than in comparative example 4.

CONCLUSION

Based on the results of Comparative Example 3 and Working Example 3, it was found that the sound pressure of the friction sound between sheets of paper when the paper is fed from the holder increased as a result of the two protrusions being provided in the vicinity of the feed port so as to contact the fed paper. This indicates that the difference between the sound pressure when no paper jam will occur and the sound pressure when a paper jam will occur may be more pronounced than in the configuration in which the protrusions are not provided. In other words, the results suggest that providing two or more protrusions in the vicinity of the feed port may increase the accuracy of detecting an indication that a paper jam will occur.

To verify this possibility, Comparative Example 4 and Working Example 4 were carried out, and the results thereof showed that providing two protrusions in the vicinity of the feed port produced a more pronounced difference between the sound pressure when no paper jam will occur (the second and third sheets of paper) and the sound pressure when a paper jam will occur (the fourth sheet of paper) than a configuration in which no protrusions are provided (Comparative Example 4). Accordingly, it was confirmed that providing two or more protrusions in the vicinity of the feed port increases the accuracy of detecting an indication that a paper jam will occur.

Figure 16:
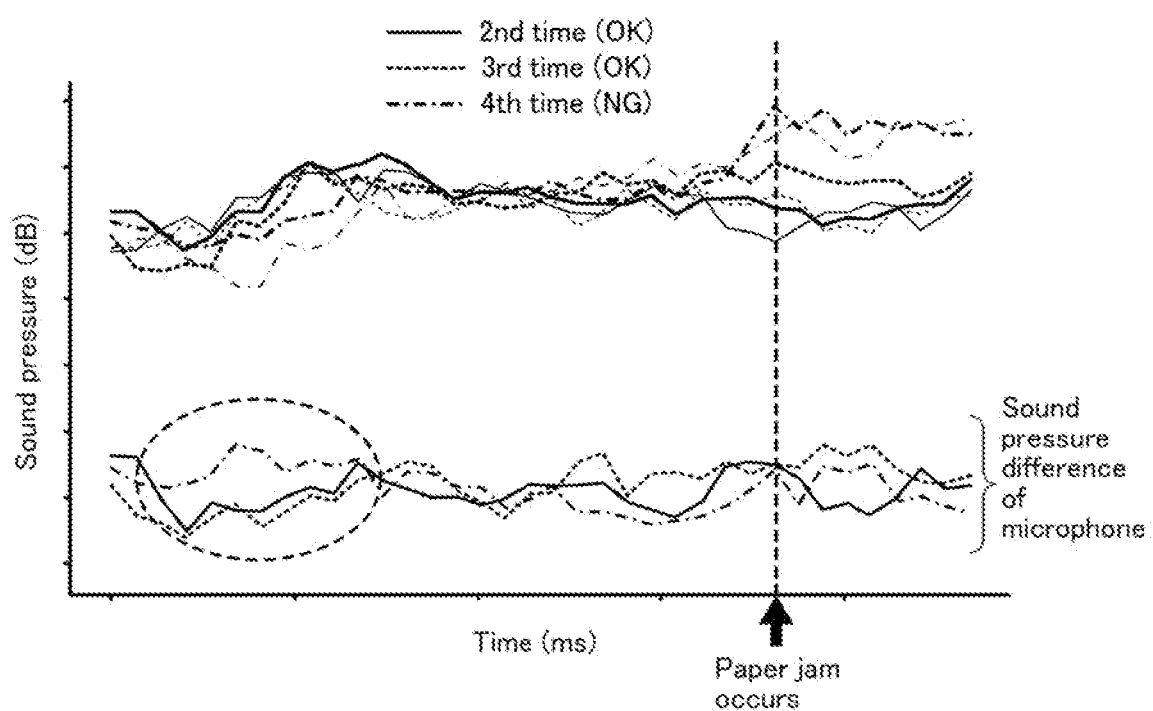
FIG. 16 is a diagram illustrating an example of results of Working Example 5.

(5) Results of Verifying Correlation Between Sound Pressures of Friction Sounds Collected by Two Microphones In Working Example 5, two microphones where disposed on respective sides of the paper feed rollers as illustrated in FIG. 9, friction sounds between sheets of paper arising when the paper is fed from the holder were collected, and the correlation between the sound pressures of the friction sounds collected by the two microphones was verified. As in Working Examples 2 and 4, the first to third sheets of paper fed from the holder were standard sheets of paper, whereas the fourth sheet was two sheets of paper stapled together. The first to fourth sheets were fed consecutively, and the friction sounds arising during the feeding was collected using the two microphones. These operations were repeated three times, FIG. 16 illustrates an example of the results thereof. FIG. 16 is a diagram illustrating an example of the results of Working Example 5.

As indicated in FIG. 16, the sound pressure of the friction sound arising before a paper jam occurs decreased for the stapled fourth sheet of paper. At this time, the microphones may be correlated with each other by obtaining the difference between the sound pressures of the friction sounds collected by the two microphones, for example. One of the two microphones collects the friction sound from the side of the paper on which the paper is stapled, and the other microphone collects the friction sound from the side opposite from the side on which the paper is stapled, i.e., the side of the paper which is not stapled. Obtaining the absolute value of the difference between the sound pressures of the friction sounds collected by the two microphones confirmed that the absolute value of the difference between the sound pressures of the friction sounds increased with the stapled paper. This suggests that correlating the microphones in this manner makes it possible to detect an indication that a paper jam will occur.

OTHER EMBODIMENTS

Although a paper jam indication detection device and a paper jam indication detection method according to one or more aspects of the present disclosure have been described thus far based on embodiments, the present disclosure is not intended to be limited to these embodiments. Variations on the present embodiment conceived by one skilled in the art, embodiments implemented by combining constituent elements from different other embodiments, and the like may be included in the scope of one or more aspects of the present disclosure as well, as long as they do not depart from the essential spirit of the present disclosure.

For example, some or all of the constituent elements included in the paper jam indication detection device according to the foregoing embodiments may be implemented by a single integrated circuit through system LSI (Large-Scale Integration). For example, the paper jam indication detection device may be constituted by a system LSI circuit having a sound collector, an indication detector, and a signal outputter. Note that the system LSI circuit need not include a microphone.

"System LSI" refers to very-large-scale integration in which multiple constituent elements are integrated on a single chip, and specifically, refers to a computer system configured including a microprocessor, read-only memory (ROM), random access memory (RAM), and the like. A computer program is stored in the ROM, The system LSI circuit realizes the functions of the devices by the microprocessor operating in accordance with the computer program.

Note that although the term "system LSI" is used here, other names, such as IC, LSI, super LSI, ultra LSI, and so on may be used, depending on the level of integration. Further, the manner in which the circuit integration is achieved is not limited to LSIs, and it is also possible to use a dedicated circuit or a general purpose processor. It is also possible to employ a Field Programmable Gate Array (FPGA) which is programmable after the LSI circuit has been manufactured, or a reconfigurable processor in which the connections and settings of the circuit cells within the LSI circuit can be reconfigured.

Further, if other technologies that improve upon or are derived from semiconductor technology enable integration technology to replace LSI circuits, then naturally it is also possible to integrate the function blocks using that technology, Biotechnology applications are one such foreseeable example.

Additionally, rather than such a paper jam indication detection device, one aspect of the present disclosure may be a paper jam indication detection method that implements the characteristic constituent elements included in the device as steps. Additionally, aspects of the present disclosure may be realized as a computer program that causes a computer to execute the characteristic steps included in such a paper jam indication detection method. Furthermore, aspects of the present disclosure may be realized as a computer-readable non-transitory recording medium in which such a computer program is recorded.

INDUSTRIAL APPLICABILITY

According to the present disclosure, an indication that a paper jam will occur, such as lifting of paper, can be detected based on a decrease in friction sounds between sheets of paper when the paper is fed. As such, the present disclosure can be applied in devices which feed paper to a variety of processing devices that process paper, and can therefore be applied in a variety of fields, such as household, industrial, and research applications.

The invention claimed is:

1. A paper jam indication detection device for detecting an indication that a paper jam will occur in a paper feed device, the paper jam indication detection device comprising:
a sound collector configured to collect a friction sound produced by friction between a plurality of sheets of paper when the paper is fed from a holder holding the plurality of sheets of paper;
an indication detector configured to detect the indication that the paper jam will occur in the paper feed device by determining whether the friction sound has decreased by determining whether the friction sound is lower than a predetermined value set based on past history; and
a signal outputter configured to, when the indication that the paper jam will occur is detected by the indication detector, output a signal to the paper feed device for stopping the paper from being fed from the holder.

2. The paper jam indication detection device according to claim 1, wherein:
the friction sound is at a frequency in an ultrasonic band produced by friction between the paper fed from the holder and the paper held in the holder; and
the decrease in the friction sound is a decrease in a sound pressure of the friction sound.

3. The paper jam indication detection device according to claim 1, wherein:
the sound collector is configured to collect the friction sound using a microphone; and
the indication detector is configured to detect the indication that the paper jam will occur when the friction sound collected by the microphone decreases.

4. The paper jam indication detection device according to claim 1, wherein:
the sound collector is configured to collect the friction sound using a plurality of microphones; and
the indication detector is configured to detect the indication that the paper jam will occur by correlating friction sounds collected by the plurality of microphones.

5. The paper jam indication detection device according to claim 3,
wherein the paper feed device includes:
a feed port configured to feed the paper from the holder; and
a separation roller configured to separate one sheet, at a time, of the paper fed through the feed port,
wherein the microphone is closer to the holder than to the separation roller.

6. The paper jam indication detection device according to claim 5, further comprising:
at least two protrusions configured to contact the paper fed from the holder,
wherein the at least two protrusions are closer to the feed port than to a position at which the paper fed from the holder contacts the separation roller.

7. The paper jam indication detection device according to claim 5,
wherein the microphone is in a vicinity of the feed port.

8. The paper jam indication detection device according to claim 5, wherein:
the paper feed device further includes a paper feed roller configured to feed the paper from the feed port; and
the microphone is above the feed port and alongside the paper feed roller with respect to a first direction intersecting a second direction in which the paper is fed from the holder.

9. The paper jam indication detection device according to claim 8,
wherein the microphone is one of a plurality of microphones on respective sides of the paper feed roller with respect to the first direction.

10. A paper jam indication detection method for detecting an indication that a paper jam will occur in a paper feed device, the paper jam indication detection method comprising:
collecting a friction sound produced by friction between a plurality of sheets of paper when the paper is fed from a holder holding the plurality of sheets of paper;
detecting the indication that the paper jam will occur in the paper feed device by determining whether the friction sound has decreased by determining whether the friction sound is lower than a predetermined value set based on past history; and
when the indication that the paper jam will occur is detected, outputting a signal to the paper feed device for stopping the paper from being fed from the holder.

11. A non-transitory computer-readable medium having recorded thereon a program for causing a computer to execute the paper jam indication detection method according to claim 10.

* * * * *